United States Patent [19]

Le Guet et al.

[11] Patent Number: 4,843,460

[45] Date of Patent: Jun. 27, 1989

[54] ELECTRO-OPTICAL DEVICE AND PROCESS FOR REAL TIME MEASUREMENT OF THE MOTION OF A MOBILE RIGID STRUCTURE UNDER THE INFLUENCE OF A FLUID

[75] Inventors: Pierre-Loïc Le Guet, Bures-Sur-Yvette; Christine Lempereur; Jean-Michel Mathé, both of Toulouse, all of France

[73] Assignee: Etat Francais, Armees, France

[21] Appl. No.: 111,497

[22] Filed: Oct. 14, 1987

[30] Foreign Application Priority Data

Oct. 20, 1986 [FR] France .................. 86 14567

[51] Int. Cl.⁴ .............................................. H04N 7/18
[52] U.S. Cl. ................................. 358/107; 358/125; 358/93; 358/99
[58] Field of Search ............... 358/93, 125, 126, 99, 358/107; 382/23

[56] References Cited

U.S. PATENT DOCUMENTS 4,123,017  12/1978  Lewis et al. .................. 358/126 X
4,549,211  12/1985  Assael et al. .................. 358/126
4,706,119  11/1987  Shatto, Jr. et al. ............. 358/99

Primary Examiner—James J. Groody
Assistant Examiner—Victor R. Kostak
Attorney, Agent, or Firm—Oliff & Berridge

[57] ABSTRACT

Real time measurement of the motion of a rigid mobile structure in a fluid is achieved by a device comprising at least four unaligned bright spots arranged in a predetermined way on the structure under observation and at least two synchronized video cameras which are arranged with respect to a fixed point. The dimensions of each bright spot are such that the image of each bright spot is intercepted at the focal plane of each camera by about five to fifteen scanning lines. The processing and computing device provides the following functions: collection of the image coordinates of points whose brightness exceeds a certain predetermined level; counting and memorization of these coordinates and of the lengths of the segments of the bright spots intercepted by the scanning lines; calculation of the image coordinates of the barycenters of the bright spots and, finally, calculation of the three-dimensional coordinates of these barycenters to the fixed point. The device is particularly suited to the study of the motion and steering of ship or airplane models in test facilities.

13 Claims, 8 Drawing Sheets

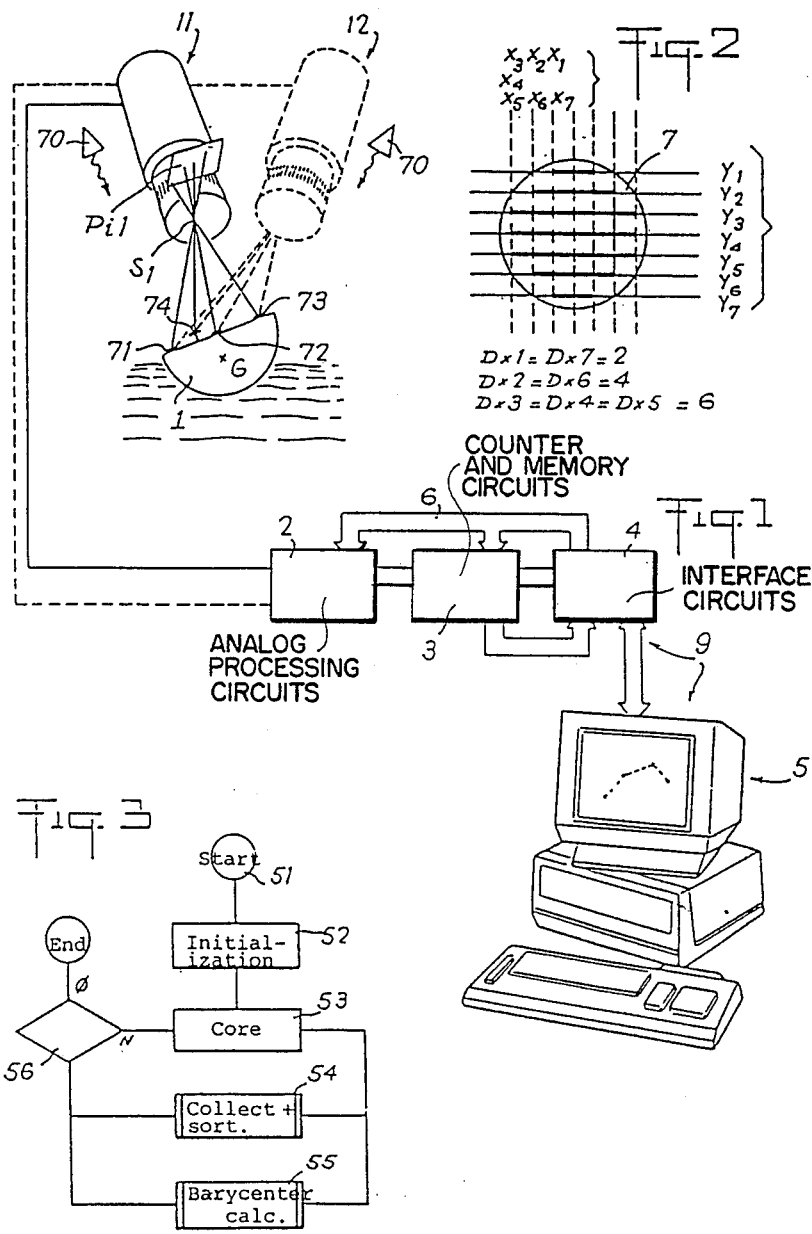

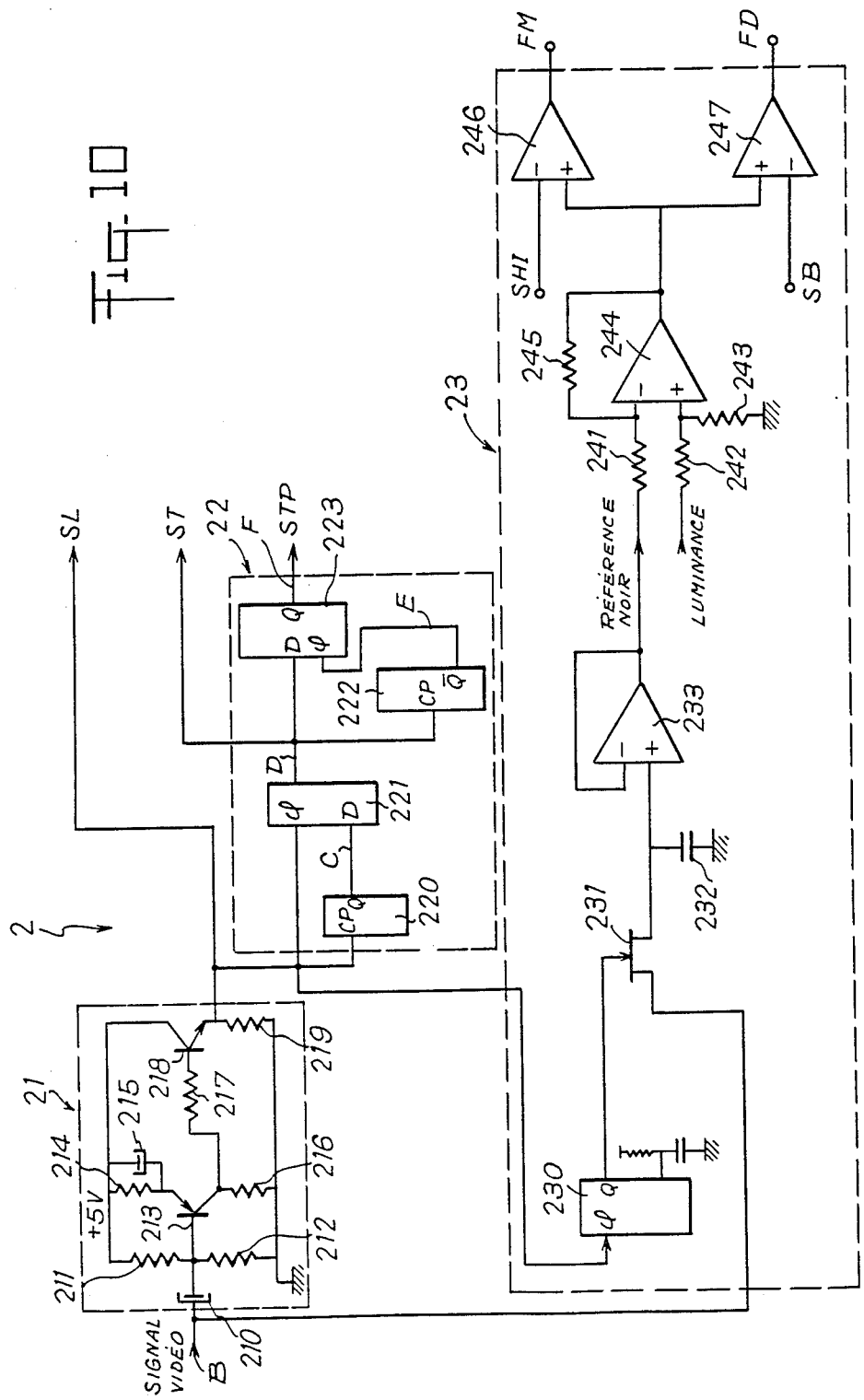

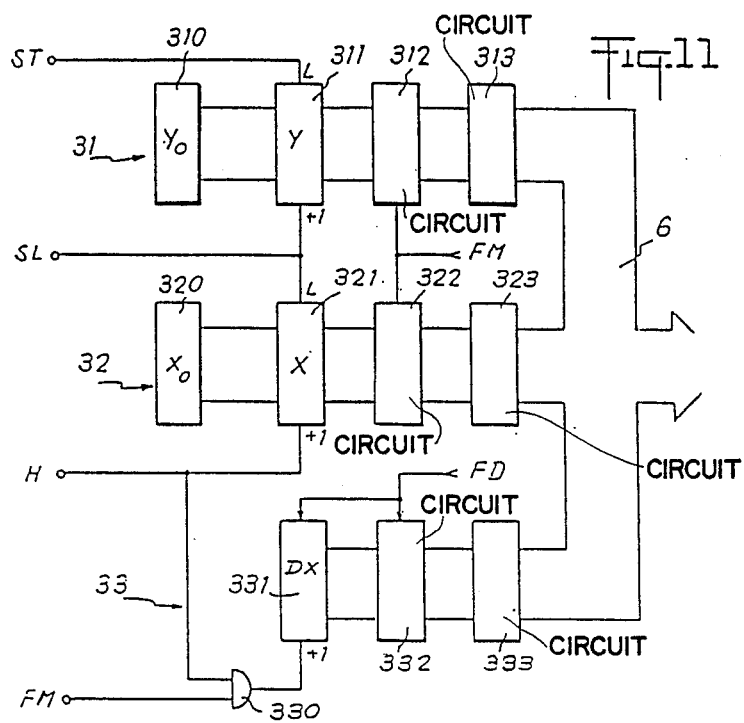
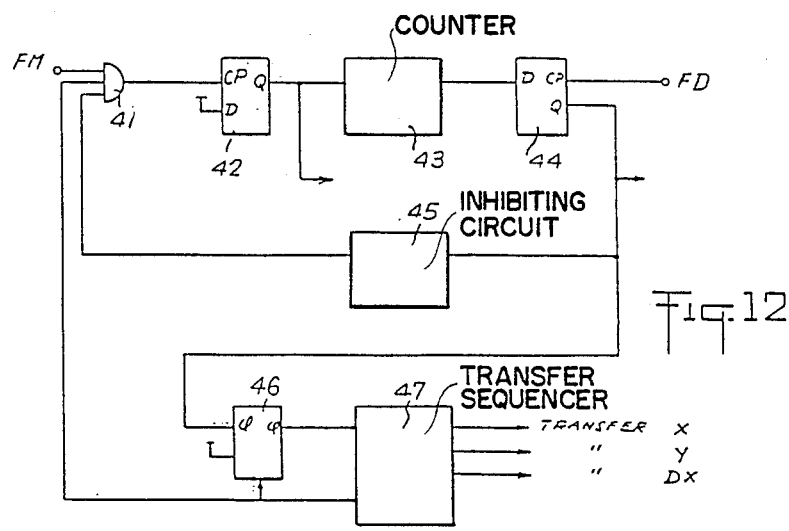

ELECTRO-OPTICAL DEVICE AND PROCESS FOR REAL TIME MEASUREMENT OF THE MOTION OF A MOBILE RIGID STRUCTURE UNDER THE INFLUENCE OF A FLUID

BACKGROUND OF THE INVENTION

1. Field of the Invention

The subject of the present invention is a means and a device for the real time measurement of the motion of a mobile rigid structure under the influence of a fluid, such as an aircraft model in a wind tunnel, a drilling platform or a model of a seagoing vessel in a test basin. The following description will deal more particularly with the latter case of a structure floating in a test basin. It is particularly important to be able to determine the position in the water of a model vessel in the course of hydrodynamic testing in basins where swells of varying amplitude and frequency can be generated, in order to be able to predict the behavior of the vessel concerned under real sailing conditions.

2. Description of the Prior Art

Measurement of the position of a model in a testing basin is generally carried out with the help of a mechanical follower installed at the vessel's stern. This arrangement suffers from certain disadvantages since a mechanicl contact must always be arranged between the vessel whose performance is to be studied and the measuring system itself.

SUMMARY OF THE INVENTION

The purposes of the present invention are to eliminate the need for any mechanical contact between the structure whose behavior is under study and the measuring device and to allow some of the coordinates $X_g$, $Y_g$ and $Z_g$ of the center of gravity or barycenter of the structure, which, in the case of a vessel, correspond to its runniing motion, yaw and heave with respect to a fixed point associated with the test basin. The measurement device also determines the angles of pitch or attitude $\theta$, roll $\phi$, as well the dynamic heading, or yaw $\psi$ of the vessel about its own center of gravity.

These purposes are achieved in the present invention by means of a device characterized in that it comprises at least four nonaligned bright spots arranged on the floating structure in predetermined positions so as to allow the behavior of the aforesaid structure to be monitored, which device further comprises at least two synchronized video cameras whose positions are dfined with resepct to a fixed point by placing an arrangement of at least three bright spots in the common field of view of the aforesaid video cameras, the dimensions of each of these bright spots are such that the image of each spot intercepts some five to fifteen scanning lines at the focal plane of each video camera, whereby the video signals supplied by the aforesaid video cameras are applied to a processing unit comprising analog circuits for extracting from the image individual points of predetermined brightness among the synchronizing and input image coordinate signals, whereby the aforesaid processing unit further comprises signal counter and memory circuits to count and record the coordinates and the lengths of the segments of the aforesaid bright spots intercepted by the scanning lines of each of the aforesaid video cameras, control and interface circuits connected to a computer in order to be able to determine the image coordinates of the barycenters of the aforesaid bright spots at the focal plane of each camera, and then with respect to a fixed point, the three translatory movements and the three rotary movements of the aforesaid floating structure are derived from the divergence among these barycenter coordinates.

According to one particular application, the device according to the present invention additionally comprises means of measuring parameters such as running motion x, yaw y and heading or course $\psi$ by means of which the trajectory of the floating structure can be defined as well as a means of maintaining the floating structure on its trajectory, which operates by comparing actual parameters with preprogrammed parameters.

The device according to the present invention allows dynamic measurement of the attitudes of the floating structure under the action of swell, wind or current to be carried out with a high level of accuracy and without the constraints which would result from the need to provide a mechanicl link with the aforesaid floating structure.

Moreover, the use of a stereoscopic system with two cameras allows measurement of the deformation of the structure under study as well as the use of a steering system in order to effect a comparison of the seagoing qualities of different vessels.

The present invention furthermore concerns an electro-optical means of real time measurement of the movement of a mobile rigid structure under the influence of a liquid in three dimensional space, characterized in that:

(a) At least four nonaligned bright spots are placed at predetermined positions with respect to the structure under study;

(b) At least two synchronized cameras are positioned in the vicinity of the aforesaid structure, whereby the viewfinder axes of these cameras are aligned so that the field of view of each camera includes at least three of the same aforesaid bright spots, whereby the dimensions of each bright spot are such that the image of each spot intercepts some five to fifteen scanning lines at the focal plane of each video camera.

(c) The video signals supplied by the two cameras (11, 12) include synchronizing and brightness signals whose levels exceed a given predetermined value ($n_1$).

(d) The X and Y coordinates and the length of the segments DX of the aforesaid bright spots intercepted by the scanning lines of each of these video cameras are counted and memorized;

(e) The image coordinates of the barycenter of each bright spot detected on the basis of the X, Y coordinates and the lengths DX of the segments of each bright spot detected and finally the three dimensional coordinates of each of the bright spots with respect to a fixed point OXYZ derived from the image coordinates of the barycenter of each bright spot are calculated at the focal plane of each of the aforesaid video cameras; the three translatory and three rotary movements of the structure are derived from the divergence of the three dimensional coordinates of each bright spot with respect to a fixed point OXYZ.

BRIEF DESCRIPTION OF THE DRAWINGS

The other characteristics and the advantages of the present invention will be found in the following description of specific embodiments which are merely cited as examples with reference to the attached drawings, where:

FIG. 1 is a perspective and block diagram of the general arrangement of an electro-optical device according to the present invention together with data processing devices and the video cameras used for image recording purposes;

FIG. 2 is a block diagram of the focal plane image of a bright spot in a video camera;

FIG. 3 is a flow chart illustrating the basic data processing stages employed in the device according to the present invention;

FIG. 10 is a diagram of one possible arrangement of analog circuitry to process video signals supplied by a video camera;

FIG. 11 is a diagram of one possible arrangement of counter and memory circuitry handling input signals from the circuits shown in FIG. 10;

FIG. 12 is a diagram of one possible arrangement of the control and interface circuitry associated with a computer as well as the circuitry shown in FIG. 11;

DESCRIPTION OF THE PREFERRED EMBODIMENTS

Figure 4:
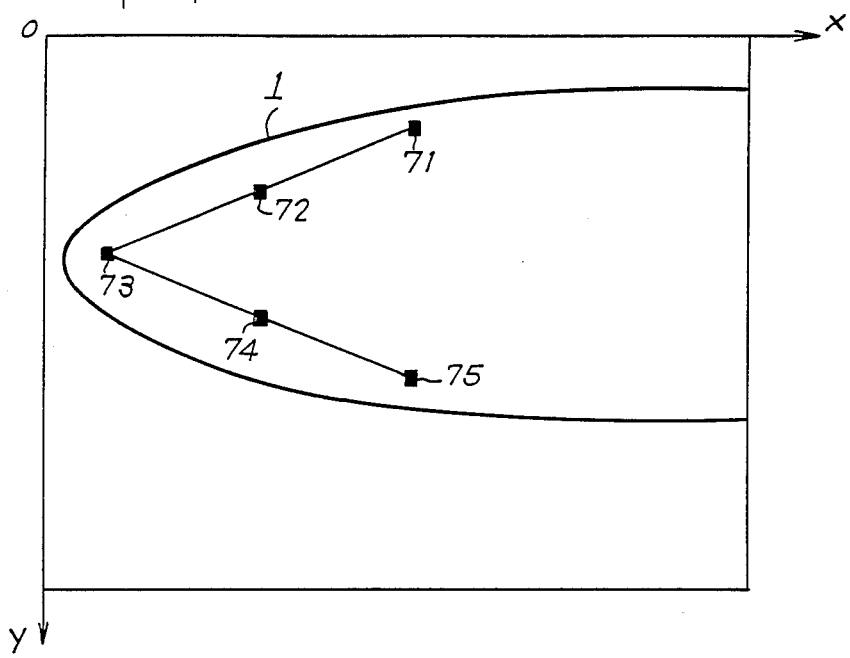
FIG. 4 is a plan view of one example of an arrangement of bright spots on a structure under study.

FIG. 1 shows a rigid structure 1, such as a model of a boat or other vessel afloat in a test basin above which two fixed video cameras 11, 12 are arranged, whereby bright spots 71, 72, 73 and 74 are placed at predetermined positions on the structure 1 so as to lie within the fields of view of the aforesaid video cameras. The focal plane $P_i1$ and the focal axis $S_1$ of the lens of the video camera 11 are shown here.

Cameras 11, 12 may consist of image analyser tubes, or preferably, photodiode cameras such as CCD cameras. As an example, CCD cameras with a resolution of 384 pixels per line and a 576 line frame were used with a pixel diameter of 12×12 microns. Cameras of this type can operate with a maximum frame frequency of 90 Hz.

Video signals supplied by the two video cameras 11, 12 are supplied to a processing and calculating device 9 which comprises a computer 5 and interface circuitry to collect and process the video signals provided by the aforesaid video cameras. The interface circuitry consists of analog processing circuits 2 which include circuits for the extraction of synchronizating and input signals of individual points of light in the image, thus providing signals of the images of the light sources 71, 72, 73 and 74. The coordinates and the lengths of the segments of the different bright spots recorded at the focal planes of the cameras 11, 12 are processed and handled by the counter and memory circuits 3. Finally, the counting circuits 3 and the computer 5 are linked over the buses 6 by the interface circuits 4 themselves as well as the control circuitry. The interface circuitry comprises in particular a clock and buffer circuits.

FIG. 2 shows the image 7 of a bright spot 71, 72, 73 or 74 in the focal plane of camera 11, 12. It can be seen that in this case the image 7 of the bright spot intercepts several scanning lines $Y_1$-$Y_7$.

The size of the bright spots 71, 72, 73 and 74 and the position of cameras 11 and 12 with respect to the structure 1 are selected so that the image 7 of each bright spot 71, 72, 73 or 74 in the photosensitive image plane of each camera 11, 12 intercepts some five to seven camera scanning lines. The analog processing circuits associated with the counters 3 will then proceed to identify the x and y coordinates of each segment of the image 7 of the bright spot at the focal plane of each camera and will also determine the length of Dx of each segment comprising the image of the bright spot. FIG. 2, for example, shows the image of a bright spot consisting of a group of seven segments of different lengths comprising those parts of the scanning lines which intercept the image 7 of the bright spot concerned.

The video signal processing unit and the computer 5 act together to define the barycenter of the image 7 of each bright spot 71, 72, 73 or 74 recorded by cameras 11, 12, which considerably enhances the accuracy of location of the bright spots.

The task of the software which handles data signals from the individual points of light is to reproduce the bright spot barycenters which identify the behavior of the object of study. In this context, the term real time indicates that the results of measurement must be obtained within 16.6 ms (which corresponds to a frame frequency of 60 Hz).

The information for each spot-image in bit form will typically be contained, for example, in a 32 octet table. The first two words in this table contain the present frame number, the $Y_o$ ordinate of the first bright segment (depending on the direction of the line scan) comprising the spot-image as well as the number of bright segments defining it. The remaining 14 words provide a precise definition of bright spot geometry; this includes the abscissa $X_i$ where the segment is detected and the length $DX_i$ of each segment. Bright spots are limited in this way to interception of not more than 14 lines in the camera matrix.

After computation of the barycenter of the polygon which describes the bright spot, all the useful information will be contained in 10 octets. The image coordinates of the barycenter are stored in 2×4 octets and the frame number is stored in two octets. In this way, although the system effectively operates in real time, at least three times more data can be saved for a given memory capacity.

The software employed to process the data triplets (X, Y and DX) is structured as follows:

After the start-up and initialization phases 51 and 52 respectively, during which threshold adjustments are carried out, jobs are allocated by a core scheduler 53 as a function of external events, i.e. the presence of data at the interface 4 or the presence of bits of information awaiting processing.

The data collecting and sorting software 54 and a program for computation of the barycenter 55 are both controlled by the aforesaid core scheduler 53.

The core scheduler 53 tests two variables: if a piece of information is available at the interface, the data collecting and sorting procedure 54 is called up. If this is not the case, the core will test whether the triplet tables are full (phase 56) and if so, the procedure for computation of the barycenter 55 will be activated.

The data collecting and sorting software 54 whose flow chart is shown in tables I and II, reads the triplets X, Y and Z at the interface. This procedure checks whether this segment is part of a spot-image already indexed in the current frame. This search is carried out for the X and Y values; if a segment such as:

$$X_{(Y-1)} - p < X_{(Y)} < X_{(Y-1)} + p$$

where p is a set length parameter, the X and DX information will be saved in the table for the spot-image concerned and the NB index is incremented accordingly.

If the contrary is true, a new table will be allocated for the spot-image concerned. The address of the new table is obtained from an address table containing 1024 entry points. X, Y and DX are stored in this table and the NB index is initialized at 1.

The barycenter computation procedure is illustrated in table III. This procedure manages an index which shows the address of the next table to be processed. The barycenter is then computed and saved to a measurement results table with a capacity of 128 Ko.

As soon as the phases of calibration and acquisition of bright spot image coordinate data are completed, the three dimensional coordinates of each bright spot can first be defined with respect to a fixed point and subsequently with respect to the angles of rotation of the object under study.

The purpose of the opto-electronic device according to the present invention is to allow precise calculation of the coordinates Xg, Yg, and Zg of the barycenter G of the floating structure 1 which is the subject of observation, with respect to a fixed point associated with the test bench. For this purpose, at least two video cameras 11, 12 are employed to observe the floating sturcture 1 along two different view axes, which are preferably arranged at an angle of 90° to one another. Video cameras 11, 12 are arranged so that each of them includes in its field of view at least three of the same bright spots 71, 72, 73 or 74 positioned on the floating structure 1 which is the object of study. In this way, the device according to the present invention performs a stereoscopic observation and, on the basis of the image coordinates of each bright spot provided by each camera, it is possible to define the entire movement of the floating structure.

In order to enhance measuring accuracy, a certain redundancy is allowable and as many as four or five bright spots may be placed in the field of view of each camera. One advantageous embodiment comprises an arrangement of four bright spots 71 through 74 placed in the field of view of each camera 11, 12 so as to provide totally stereoscopic images. In this case, three of the bright spots 71 through 73 may be placed on the upper surface of the floating object 1 (FIG. 1) whereas the fourth bright spot 74 is placed at a certain height above the other spots 71–73. The cameras 11, 12 are then positioned at a viewpoint well above the object 1. This arrangement provides reliable measurement without the need to process excessive amounts of information.

As shown in FIG. 4, five bright spots may be placed on the floating structure 1. In this case, the bright spots 71–75 can be arranged along the two arms of a V, whereby one spot 73 is positioned at the junction of the arms of the V and the spots are thus lined up in two rows: 71, 72 and 73; 73, 74 and 75 respectively.

Figure 5:
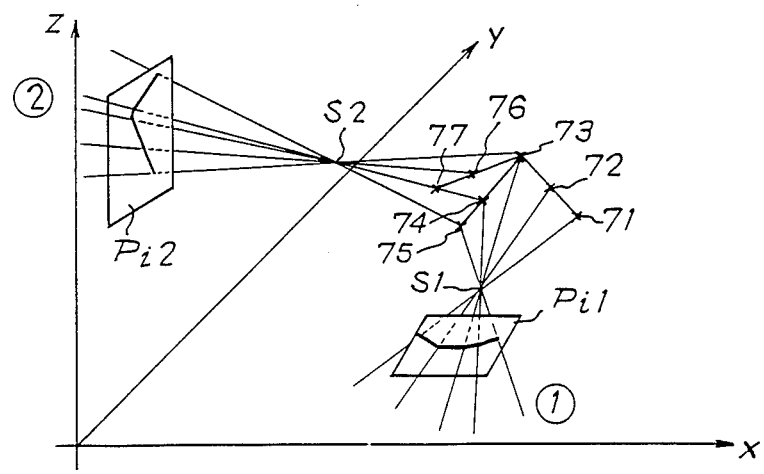
FIG. 5 is a perspective diagram of one example of an arrangement of the focal planes of two video cameras with respect to the general arrangement of the light sources.

FIG. 5 shows another embodiment employing semistereoscopic viewing. In this configuration, seven bright spots 71–77 are arranged in two Vs, whereby three bright spots 73, 74 and 75 are arranged in a row which is common to both V arrangements and are placed in the field of view of each of the cameras 11, 12 whose focal planes are $P_{i1}$ and $P_{i2}$. This arrangement thus provides a stereoscopic view of the three bright spots 73–75 and a monoscopic view of the pairs of bright spots 71, 72 and 76, 77 which only lie in the field of view of one of the cameras 11 or 12. In FIG. 5, $S_1$ and $S_2$ respectively represent the diaphragm pupils of cameras 11, 12. However, the embodiment shown in FIG. 5 remains more complex than that shown in FIG. 1 in which only four bright spots 71–74 are employed and three dimensional images of an object can be accurately rendered with the help of four bright spots placed on the object under study, provided two optical sensing means 11, 12 are used.

Figure 6:
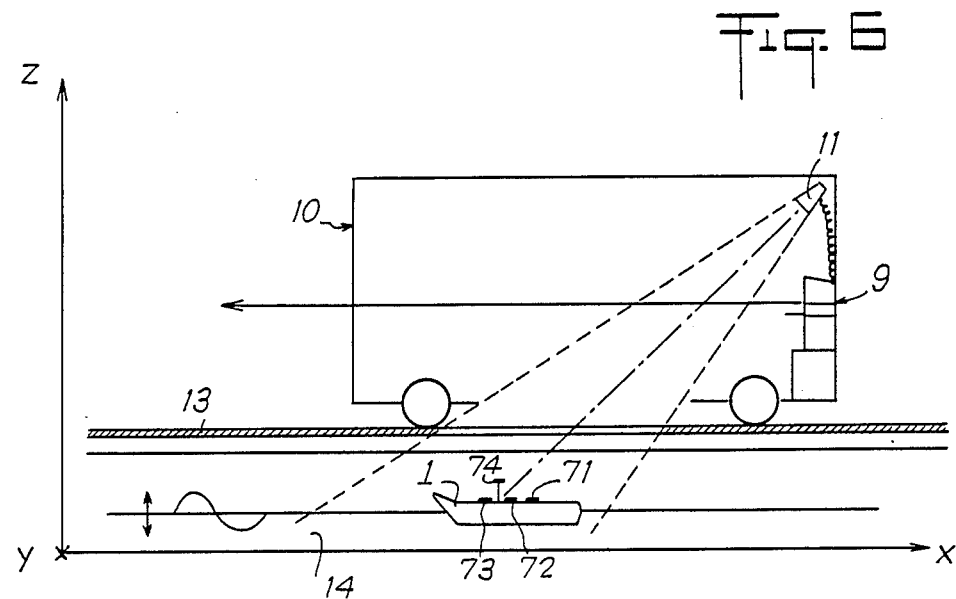
FIG. 6 is a diagrammatic front elevation of the measuring unit installed in a test basin.

FIG. 6 shows a diagram of a test basin with a fixed platform 13, a stretch of water 14 on which a floating structure 1 is placed for observation purposes, together with a trolley 10 on which the cameras 11, 12 and the data acquisition system associated with these two cameras 11, 12 are mounted. The camera trolley 10 is placed so that the bright spots 71, 72, 73 and 74 lie within the field of view of the cameras 11, 12 even when a swell is present. In this way, the measuring device allows continuous monitoring of the motion of the model 1 as well as determination of its three translatory and three rotary movements.

Figure 7:
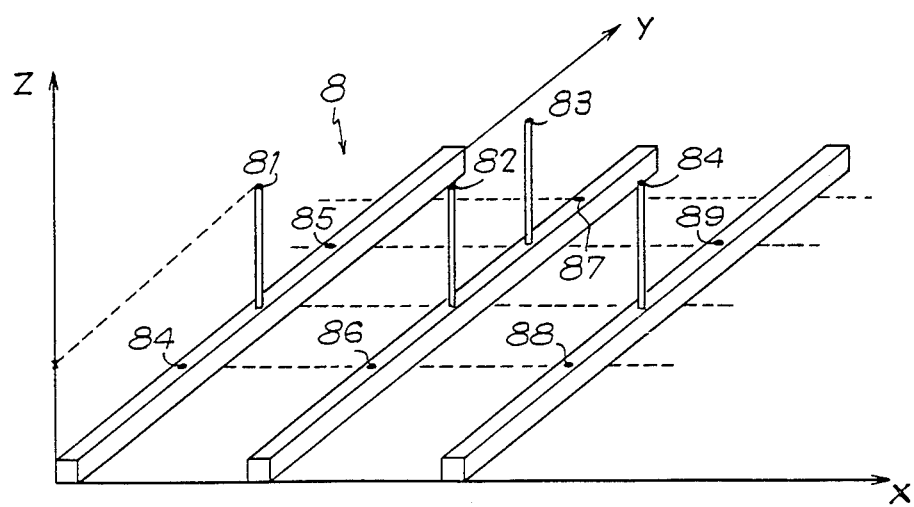
FIG. 7 is a perspective view of one possible example of a calibrating device.

In order to determine the motion of a model 1 with respect to a fixed point OXYZ, it is of course not only essential for the positions of the bright spots 71–74 to be defined in advance, but also for all the parameters concerning the conditions under which images are recorded to be known at the same time. For this purpose, calibration must be carried out with the help of a mobile rigid structure 8 which can be placed at a defined position with respect to a fixed point OXYZ associated with the test basin, whereby the aforesaid mobile structure 8 comprises a number of bright spots 81–89 whose positions on the fixed calibration structure 8 are themselves known. The bright spots 81–89, which should preferably be five to eight in number, are arranged in at least two different planes so as to permit calibration of the entire space envelope in which the bright spots 71–74 placed on the model may find themselves as the result of the latter's movement. Once calibration is completed, the mobile structure 8 is removed and the cameras 11, 12 remain in the positions in which they were placed for calibration purposes so as to allow the movement of the object 1 which is the subject of study to be recorded; the aforesaid object 1 is placed in the basin in the zone in which the calibration structure 8 had been placed previously. Thanks to the calibration process, a precise determination has already been effected of all the parameters required for calculation of the position of the center of gavity of the object 1 with respect to the fixed point OXYZ based on the image coordinates of the bright spots 71-74 at the focal planes of cameras 11, 12. As shown in FIG. 7, the calibration structure may comprise a simple horizontal and vertical bar grid on which the bright spots are mounted.

The bright spots 81-89 employed for calibration are similar to the bright spots 71-74 employed for measurement purposes but can be made of different materials. Thus, the aforesaid bright spots may consist of electroluminescent diodes or other light sources such as incandescent lamps. These bright spots may also take the form of simple reflectors illuminated by projectors 70 placed in the field of view of the cameras 11, 12.

The various-measuring circuits will now be described with reference to FIGS. 1 and 8-13.

Operation of the two video cameras 11, 12 must be synchronized. Thus, camera 11 may act as the master unit while camera 12 acts as a slave unit provided by camera 11 with its frame and line synchronizing signals, ST and SL respectively, as well as with the clock timer which sets the dot frequency (anaysis frequency of the photosensitive cells).

Figure 13:
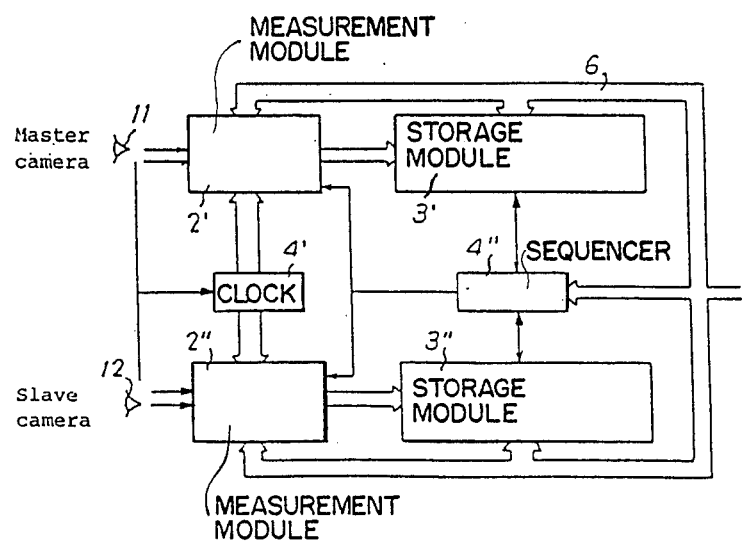
FIG. 13 is a general arrangement diagram of the electronic circuitry associated with two stereoscopic video cameras.

As shown in FIG. 13, the electronic measurement system essentially comprises four main component blocks, two of which are common to the two measuring paths whereas the other two are duplicated for each measuring path, thus comprising six modules in all.

The points analyzed are supplied to the image coordinates by a clock 4' which also detects frame parity and insures that the system is reset to zero when data acquisition is initiated, as always, by an odd frame.

A sequencer 4'' generates the various command signals and transmits them to the modules comprising the two measuring paths of the system. The clock 4' and the sequencer 4'' are common to both measuring paths.

Both cameras have identical measurement modules 2', 2'' which provide the image coordinates of the source of each bright segment as well as its length.

Modules 3', 3'' installed in each measuring path insure temporary storage of information (which may encoded in two words of 16 bits) as well as its transfer to the computer.

The frame synchronizing and line signals ST and SL respectively, an STP frame parity recognition signal and a black reference signal can all be derived from the composite video signals provided by the cameras 11, 12 with the help of an analog processing device 2, such as the device shown in FIG. 10.

Figure 8:
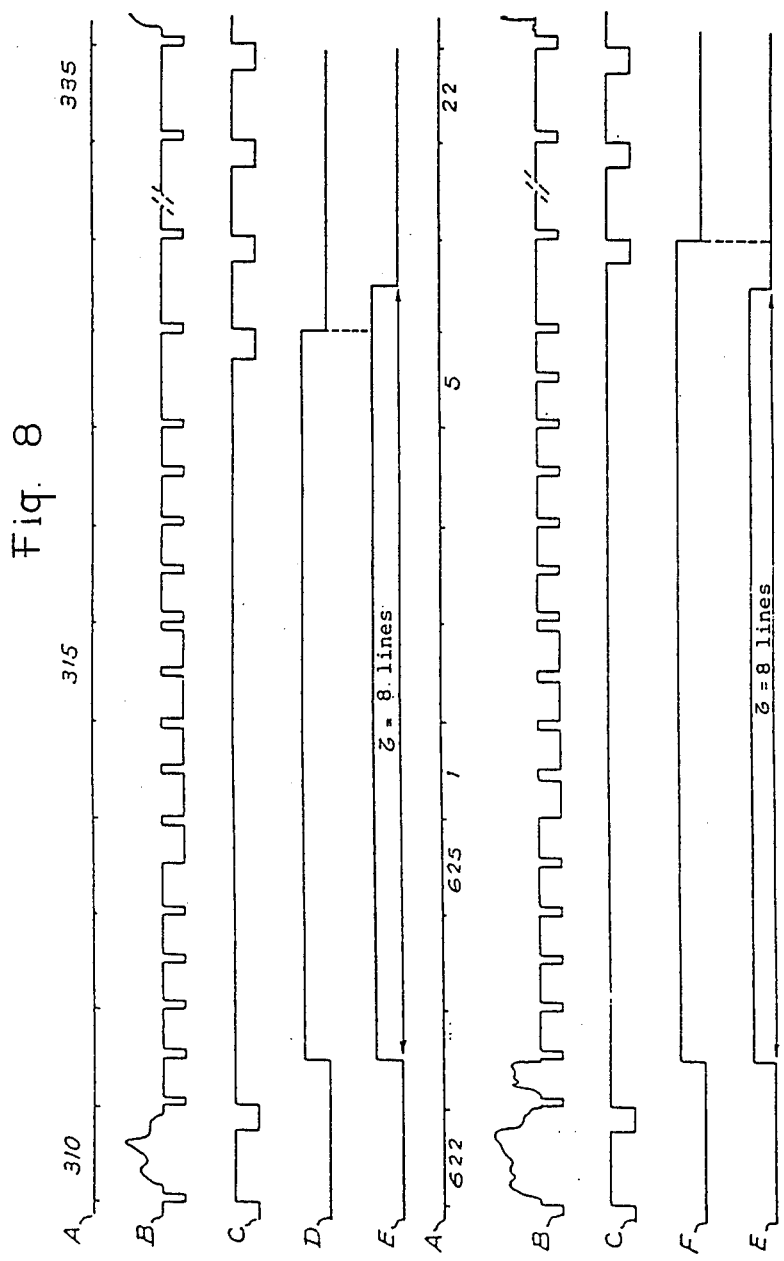
FIG. 8 is chronograms representing different signals derived from camera video signals.

The shape of these composite video signals is shown in FIG. 8 as a function of scan line numbers 1-625 indicated on the A scale. One possible type of circuit 21 for the extraction of SL line synchronization signals is shown in FIG. 10 and comprises a transistor PNP 213 which is saturated when synchronization signals appear. The video signals B are applied over a link capacitor 210 to the basis of the transistor 213 which is polarized by resistances 211, 212. The transistor transmitter 213 is connected to the power suppply over a resistance 214 mounted in parallel with a capacitor 215 whereas the transistor collector 213 is grounded over a resistance 216 on the one hand and connected over a resistance 217 to the basis of a second transistor 218, on the other hand. The SL line synchronization signal is supplied to the transmitter of the second transistor 218 which is grounded over a resistance 219.

The ST frame synchronization signal is an STP frame parity signal which can be prepared in a circuit such as circuit 22 in FIG. 10 which is capaable of discriminating between odd and even frame synchronization formats.

To detect the frame synchronization signal a resettable monostable circuit 220 is activated on each falling front of the synchronizing signal. If a new reset is not triggered within 42 ms, that is to say within ⅔ of the duration of a line, the monostable circuit 220 returns to its stable state. On the other hand, if synchronizing line signals are present at the center of the line—which will be the case in the synchronizing frame—the signal will occur while the monostable circuit has not yet returned to its rest state. This event will be memorized in a D-type flip-flop 221. The shapes of the C and D signal outputs from circuits 220 and 221 are shown in FIG. 8.

The frame parity recognition device operates on the same principle. As soon as the synchronizing frame appears, a monostable circuit 222 of 8 lines duration will be triggered. As soon as the monostable circuit 222 again falls to zero, the synchronization signal level is sampled and memorized in a flip-flop 223. FIG. 8 shows the E and F signal outputs from circuits 222 and 223. This signal is representative of parity at a 1st. logic level corresponding to an odd frame.

The inhibiting signal present in the composite video signal defines the level of the black signal n4. This frees the system from dependence on average brightness. The circuit comprising elements 230-233 inclusive shown in FIG. 10 allows the black signal reference voltage to be saved in an analog memory with a sampling duration of 5 ms. The black signal reference voltage is then removed from the brightness signal by means of a subtractor implemented on the basis of an analog amplifier with a pass band higher than 5 mHz comprising an operational amplifier 244 and the resistances 241, 242, 243 and 245.

Figure 9:
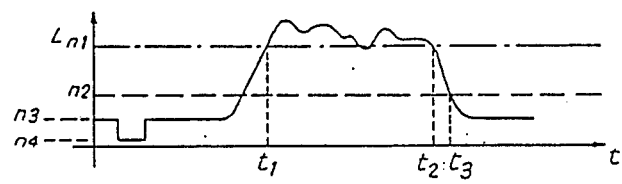
FIG. 9 is a diagrammatic representation of a brightness signal.

Two rapid comparator circuits 246, 247 supply FM and FD corresponding to the point of clearance of the thresholds SH1 at the n1 level and the SB threshold at the n2 level during the rise and fall of the video signal (FIG. 9). The threshold signals SH1 and SB are programmed by the computer. These signals can be encoded in 5 bits, for example, and converted in a d/a converter. A voltage signal can be added to the composite video output signal from the camera by an analog adder, thus providing a continuous visual check on the monitor of the points whose brightness is above the FM threshold. This method facilitates threshold adjustment.

One essential characteristic of the processing device according to the present invention lies in the acquisition of individual points of the image, whereby these points comprise bright spots of sufficient area to intercept several scan lines and which, from frame to frame, are positioned in local zones of the fields of view of the cameras.

During analysis of the image supplied by the video cameras, scanning of bright spots can advantageously be restricted to certain zones as a function of the positions of these spots in the preceding frame.

In general terms, recognition of these bright spots implies the acquisition of image coordinates of points whose brightness either lies above a certain threshold or corresponds to a specific hue. As soon as the amplitude of the brightness signal exceeds a rising threshold n1, the image coordinates x, y of the start of the bright segment intercepted by the scanner will be memorized. The process of counting the segment length dx continues as long as signal amplitide remains above a level H, which can be programmed and which may differ slightly from n1 and may be lower than n1, for example. The information triplet x, y and dx containing the description of the bright spot is transmitted to the computer as soon as video signal amplitude falls below a second level n2 which is lower than n1 and H.

FIG. 11 shows the counting and memorizing circuitry for the coordinates and the segment lengths of the various bright spots. The synchro-frame signal initializes the counter Y311 at a value Yo recorded in a register 310 which forms a parameter which will depend on the the camera standard. The counter 311 is next incremented at the synchro-line. If the counter 311 resets to zero, this indicates that the scanned line is the first information carrier line (to the extent that synchro-frame lines are rejected).

In the same way, a counter X321 is initialized at the value Xo recorded in a register 320 as soon as the synchro-line signal appears. The counter 321 is incremented by a clock synchronized with the video cameras. The value Xo is chosen so that when the counter 321 resets to zero, the composite video signal will contain a brightness signal.

Memorization of the contents of the counters 311 and 321 is implemented in the buffer registers of memorization circuits 312, 322 as soon as the FM signal appears. This signal also serves to validate counting of a segment length dx by the counter 331 which is also incremented and whose contents will be transferred to the buffer register as soon as the signal FD appears, provided that dx is longer than or equal to a reference length. The memorization circuits 312, 322 and 332 supply their information on a single bus 6 over the triple state circuits 313, 323 and 333.

From the signals FM and FD, the interface circuits 4 between the measuring and counting circuits on the one hand and the computer 5 on the other hand generate the various command signals required for measurement sampling. The command and interface circuitry is shown diagrammatically in FIG. 12.

As soon as the FM signal appears, an interference signal rejection counter 42, 43 is enabled and increments the clock frequency. This arrangement insures that transfers are inhibited if the segment is less than a certain set length. If a spot-image is enabled when the FD signal appears, the contents of the buffer registers of memorization circuits 312, 322 and 332 which correspond to the counters 311, 321 and 331 are multiplexed to a FIFO stack installed on the interface card 4.

A inhibiting circuit 45 initialized by the computer 5 inhibits spot-image acquisition for a variable period following acquisition of a bright spot. To do this the inhibiting circuit 45 is linked to one input of an AND gate ET. Another inputs of the same gate receives the FM signal, and a third input receives a signal from a transfer sequencer 47. The command logic is implemented so as to inhibit data transfer if a brightness detection function (active FM signal) occurs before the start of on-line counting (x<o). This logic operates in the same way if the FD signal appears when the brightness information has already disappeared at the end of a line. This procedure insures the rejection of spot-images which straddle the boundaries of the observed zone. Circuits 44 and 46 in FIG. 12 represent flip-flops.

Figure 14:
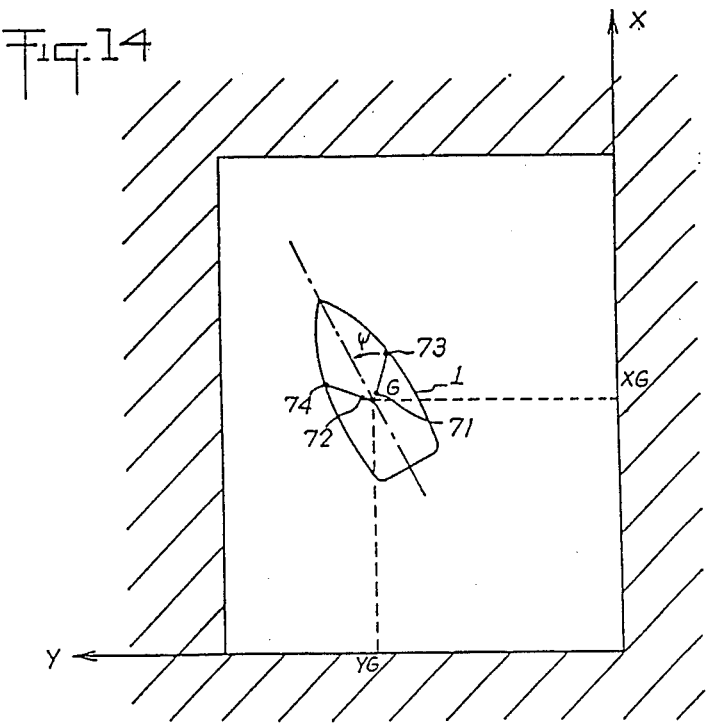
FIG. 14 is a plan view of a model which can be guided and controlled by the device according to the present invention.

The present invention can be applied to the guidance and control of models and other floating vessels, such as the ship 1 shown in FIG. 14 which is observed from a raised viewpoint by two cameras 11, 12, whereby four bright spots 71–74 are mounted on the model 1.

Figure 15:
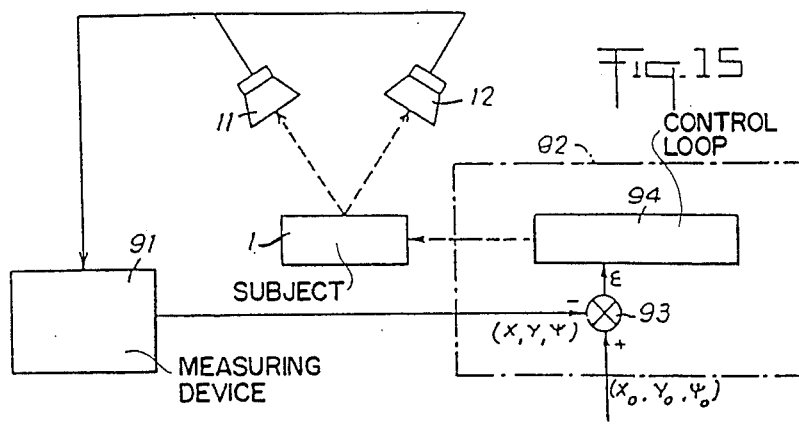
FIG. 15 is a general view of the guidance and control system of a model vessel operated in conjunction an electro-optical device according to the present invention.

In this case, the device 91 provided to measure the movement of the structure 1 will also provide real time calculation of the roll speed and prepare the necessary rudder correction command in its own control loop 92 (FIG. 15).

The measured values x (running motion), y (yaw) and $\psi$ (heading or course) defining the trajectory of the floating structure are compared at the subtractor level 93 to the programmed values $X_o, Y_o$ and $\psi_o$. The error signals are then applied to a PID-type control loop 94 whose special function is to generate a signal representing the position of the rudder which is supplied to the steering system over a serial connection.

In vessel steering applications, video cameras 11, 12 can be moved in a known direction with respect to the fixed point OXYZ.

A brief description of the operational software in the device which effects the measurement of vessel motion will be provided at this juncture:

The dialog with the measuring system is primarily provided by means of software programs. These will typically comprise the following:

INIT procedure: this procedure provides a means of communicating to the measurement system the threshold values which govern the acquisition of bright segments.

ACQ procedure: this procedure implements the acquisition and sorting of bright segments and calculates the barycenter of information bits. These procedures are written in Assembler to allow the system to be operated in real time with resepct to the length of the period required to read a frame (normally 1/50 s. In the attached tables data acquisition management programs are illustrated in the form of flow charts.

The processing of raw data inputs is handled by software programs as well:

These programs mainly serve to compute three dimensional coordinates on the basis of image coordinates and calibration coefficients as well as to perform the calculations required to reproduce the positions adopted by the model in the water under the effects of roll, pitch and yaw.

The AC acquisition program written in Pascal manages the sequence of acquisition of bright spot data. This program calls up the procedures written in Assembler which support dialog functions with the hardware interface.

The operator must first of all adjust the threshold level so that only the bright spots mounted on the model are visible in the command display. This is known as the INIT(ialization) procedure.

Data acquisition proper (the ACQ procedure) is initiated next; this procedure is terminated when a number of bits of information npt have been collected. This total quantity of information is provided by the operator.

Once the acquisition procedure is completed, all the data are stored in the central computer memory; with the help of the program, the results can be read, additional calculations can be performed and the useful information can be saved: frame number (nf), number of spot-images in the frame concerned (np) and as image coordinates ($x_g$, $x_g$). This information is kept in files f_acq 1 and f_acq 2, each of which is assigned to one of the two cameras.

The flow chart of the acquisition software AC is shown in table I.

Adjustment of threshold parameters is a function which is implemented in the INIT(ialization) procedure written in Assembler and called up by the aforesaid data acquisition management program AC (phase 52 in FIG. 3).

The operator is free to select the brightness level n1 on the basis of which the acquisition of a bright segment can be initiated. This value, from 0-64 inclusive, will depend on ambient lighting conditions and the lens aperture.

On the other hand, a minimum number of data bits can be selected below which no bright segment data will be collected. This frees the system from reacting to excess brightness levels resulting from specular reflection or error bits in the CCD sensor.

The ACQ bright segment data acquisition procedure, which is also written in Assembler, must not be called up until thresholds have been properly adjusted (in the INIT procedure). At the interface level the former procedure can read the two words containing the data on the initial corrdinates of the bright segment, segment length and the camera number.

Once this information has been acquired, it must be established whether the segment concerned belongs to a new information bit (spot-image) or not and the triplet x, y and dx must be saved to a table indexed by bit (spot-image) number and the number of the camera which recorded the segment. This procedure is described below under the heading SORT.

The software monitors the interface continuously to detect whether a spot-image is present or not. If no information is present for sampling, the program addresses itself to calculation of the barycenter of a spot-image acquired not earlier than the previous frame to avoid the performance of calculations of bright spots which have not yet been entirely defined.

This program stores useful information in the computer's central memory. Every 128 Kbyte of memory capacity allows the storage of data concerning 2000 consecutive frames, each containing three spot-images. The corresponding duration of the acquisition process at 60 Hz is of the order of 35 s.

If computer memory capacity is increased to 1 Mbyte, test runs lasting some 280 s. would be possible.

The level of data density achieved by calculating the barycenter in real time is very considerable; this enables test duration to be increased sixfold for a given memory capacity.

The general flow chart of the ACQ data acquisition procedure is shown in table II. Barycenter sorting and calculation functions (CGC) are elucidated in the flow charts shown in tables III and IV.

Calculation of the three dimensional coordinates representing the motion of the structure as such merely takes the form of solving a system of four linear equations with three unknowns based on image coordinates and calibration coefficients if the device comprises two cameras recording stereoscopic images of a structure on which four bright spots are mounted.

TABLE I

FLOW CHART OF DATA ACQUISITION SOFTWARE (Pascal)

Program name: AC

Nomenclature of variables employed in the flow chart

| | |
|---|---|
| npt: | total number of into bits or spot-images to be acquired |
| fm: | rising edge = the brightness threshold above which the acquisition of bright spots is initiated |
| fd: | falling edge = the brightness threshold which initiates transfer of the triplet (X, Y, DX) |
| nfr: | frame number |
| np: | number of bits or spot-images per frame |
| f_acq(i): | acquisition file for camera no. 1 |
| ad: | absolute address of the result segment for each camera |
| adsx: | address relative to ad of the table containing sx |
| adsy: | address relative to ad of the table containing sy |
| ads: | address relative to ad of the table containing s |
| adnfr: | address relative to ad of the table containing nfr |
| adnp: | address relative to ad of the table containing np |
| nex: | number of 128 Kbyte memory sectors available for the storage results |
| npi: | number of information bits or spot-images processed |

TABLE I (cont.)
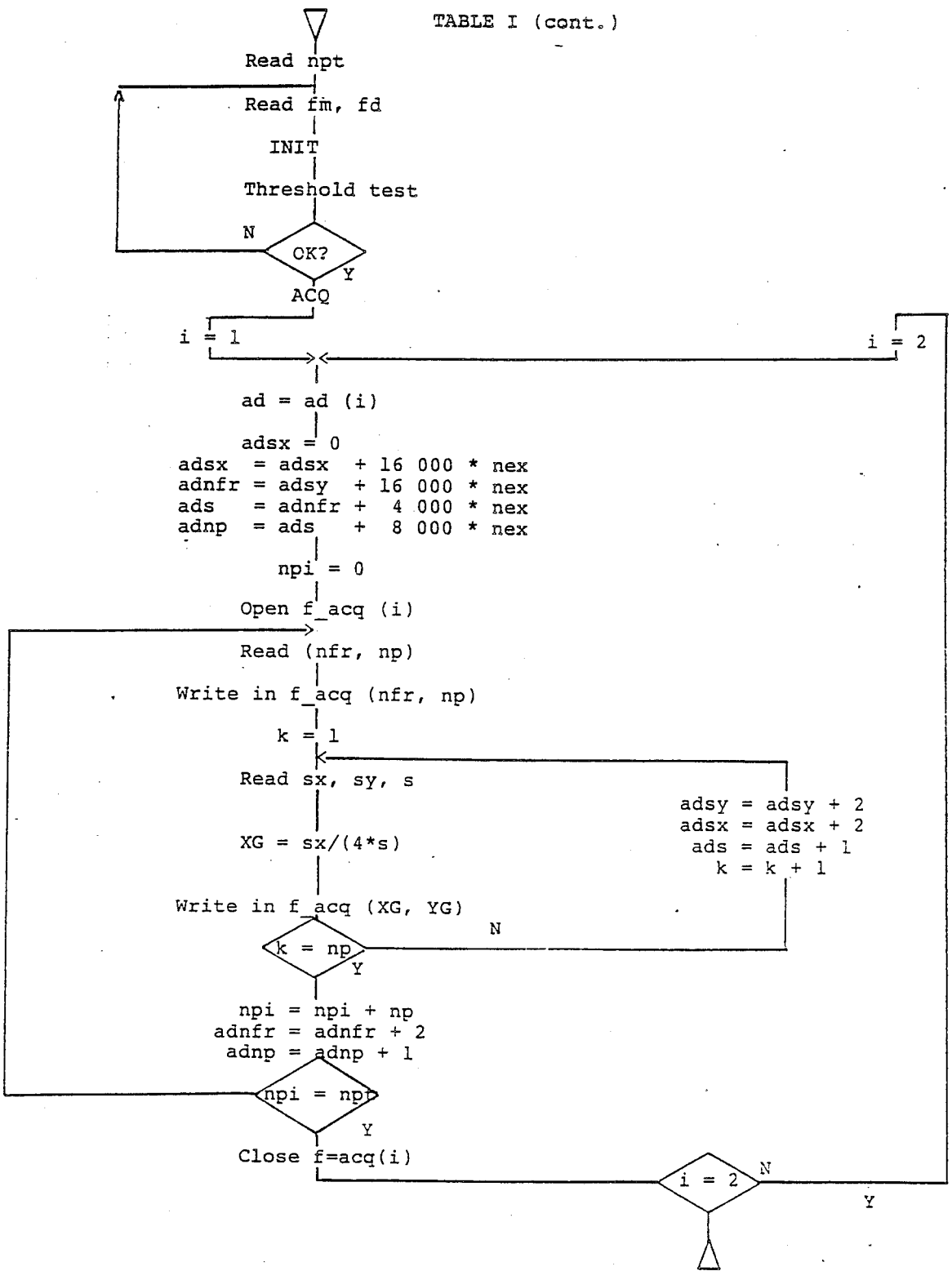

TABLE II

ACQ PROCEDURE FLOW CHART

Nomenclature of variables employed npt:   total number of bits or spot-images to be processed
np1:   number of bits or spot-images from camera no. 1
np2    remaining to be processed ncam:  camera no.
f1:    indicator showing whether calculations are to be performed for camera no. 1 or no. 2
dt1:   difference between the number of bits or spot-images acquired at the start of the present frame and the number of bits whose barycenters have already been calculated Name of the procedures whose flow charts appear below SORT1, SORT2: these procedures are employed to check to which bright spot each segment belongs and to assign each segment to the appropriate acquisition table CGC1, CGC2: these procedures calculate the barycenters of bright spots already indexed

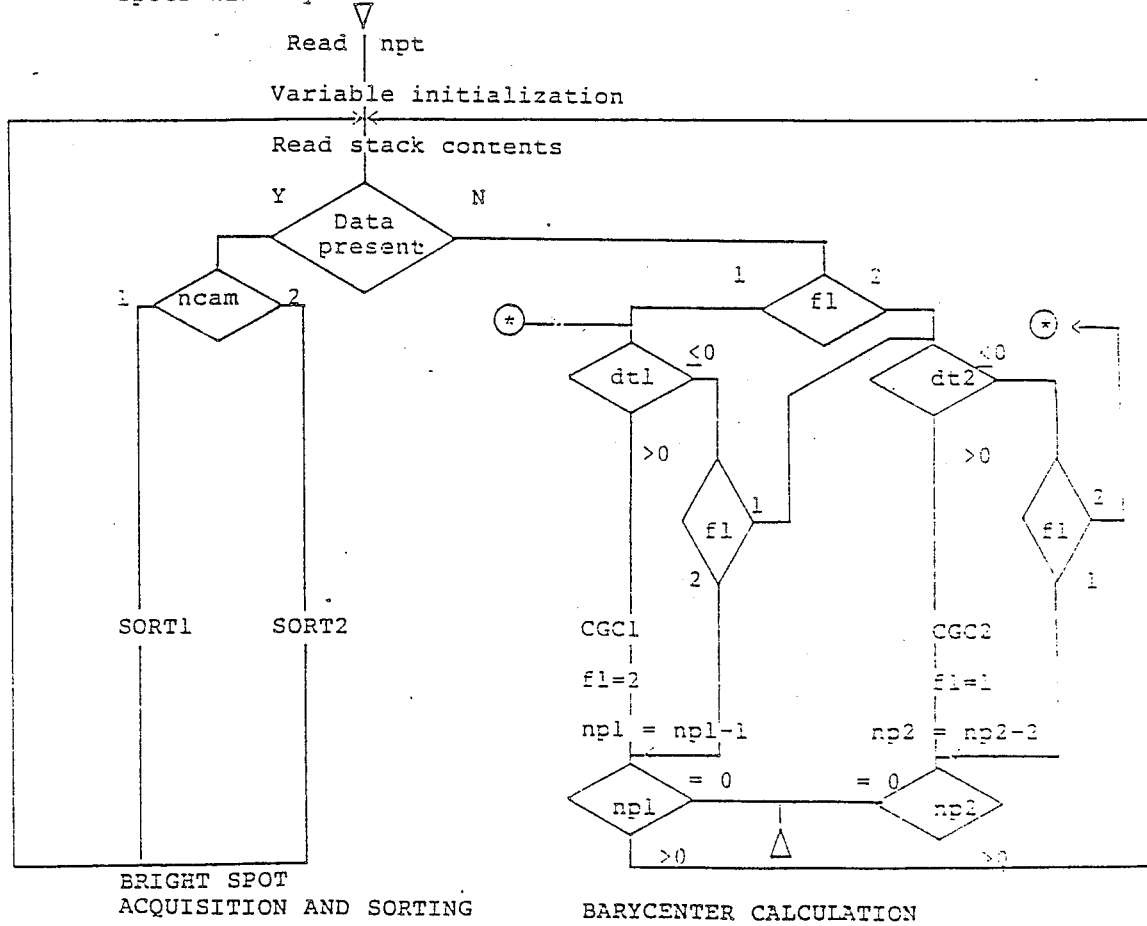

BRIGHT SPOT
ACQUISITION AND SORTING           BARYCENTER CALCULATION

TABLE III

FLOW CHART - BARYGRAM CALCULATION PROCEDURE (CGC)

Nomenclature of variables employed nbs:     number of segments comprising a spot-image
nmin:    minimum number of segments required to accept a spot-image or an information bit (this allows the elimination of parasitic dots)
X, Y:    initial segment coordinates
XG, YG:  barycenter coordinates
pt r:    cursor in the acquisition table
sx, sy,  intermediate variables
ddx, s:

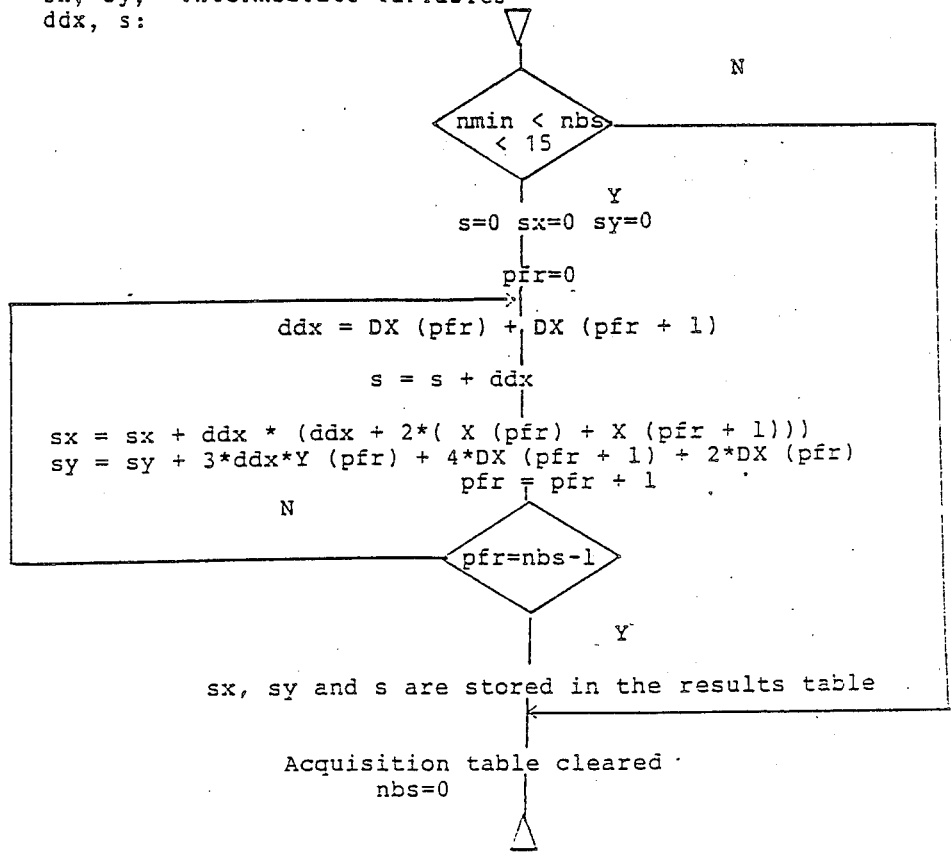

It will be noted that the entire barycenter calculation is performed in the processing phase; the coordinates XG, YG are obtained from sx, sy and s by the following relations:

$$XG = sx/(4*s)$$
$$YG = sy/(3*s)$$

TABLE IV

SORTING SOFTWARE FLOW CHART (Assembler)

Nomenclature of variables employed

| | |
|---|---|
| x, y, dx: | initial coordinates and length of a brightness segment |
| cptfr: | frame counter |
| np: | number of segments in the present line |
| nps: | number of segments in the previous line |
| ys: | ordinate of the last line on which a segment was detected |
| yp: | ordinate of the last segment acquired |
| itab: | bit (spot-images) counter |
| itabt: | number of bits or spot-images acquired at the start of the present frame |
| nbr: | number of segments in a bit or spot-image |
| cpt; | counter at nps |
| xp;: | table of segment start abscissae at the present line |
| xs: | table segment start abscissae at the previous line |

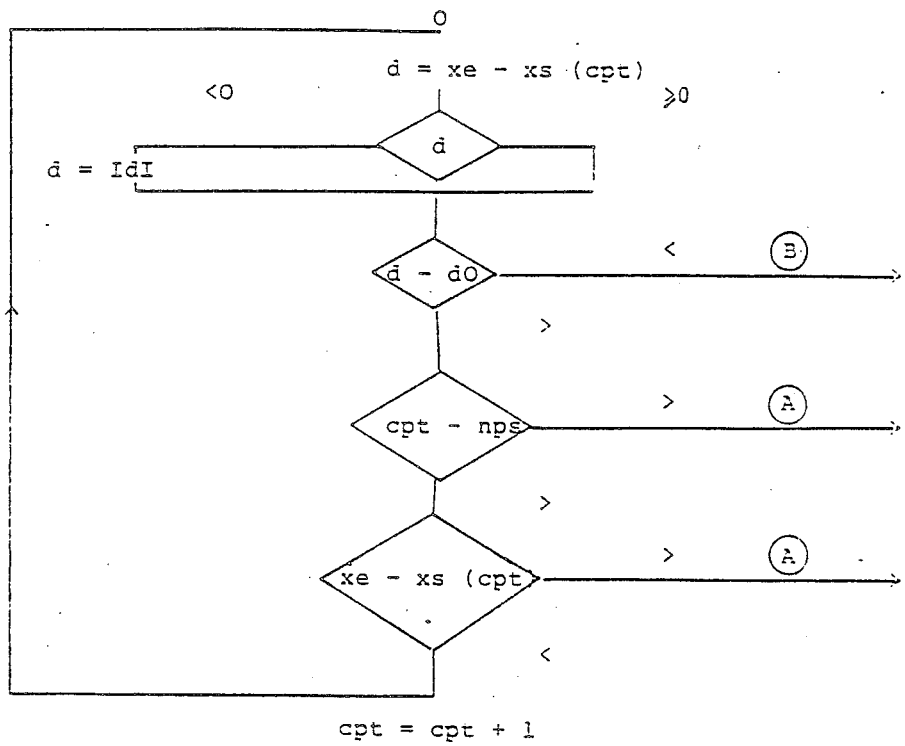

Flow chart (cont.) ⇒ Bit assignment test

TABLE IV (cont.)
Handling of two words containing X, Y, DX information
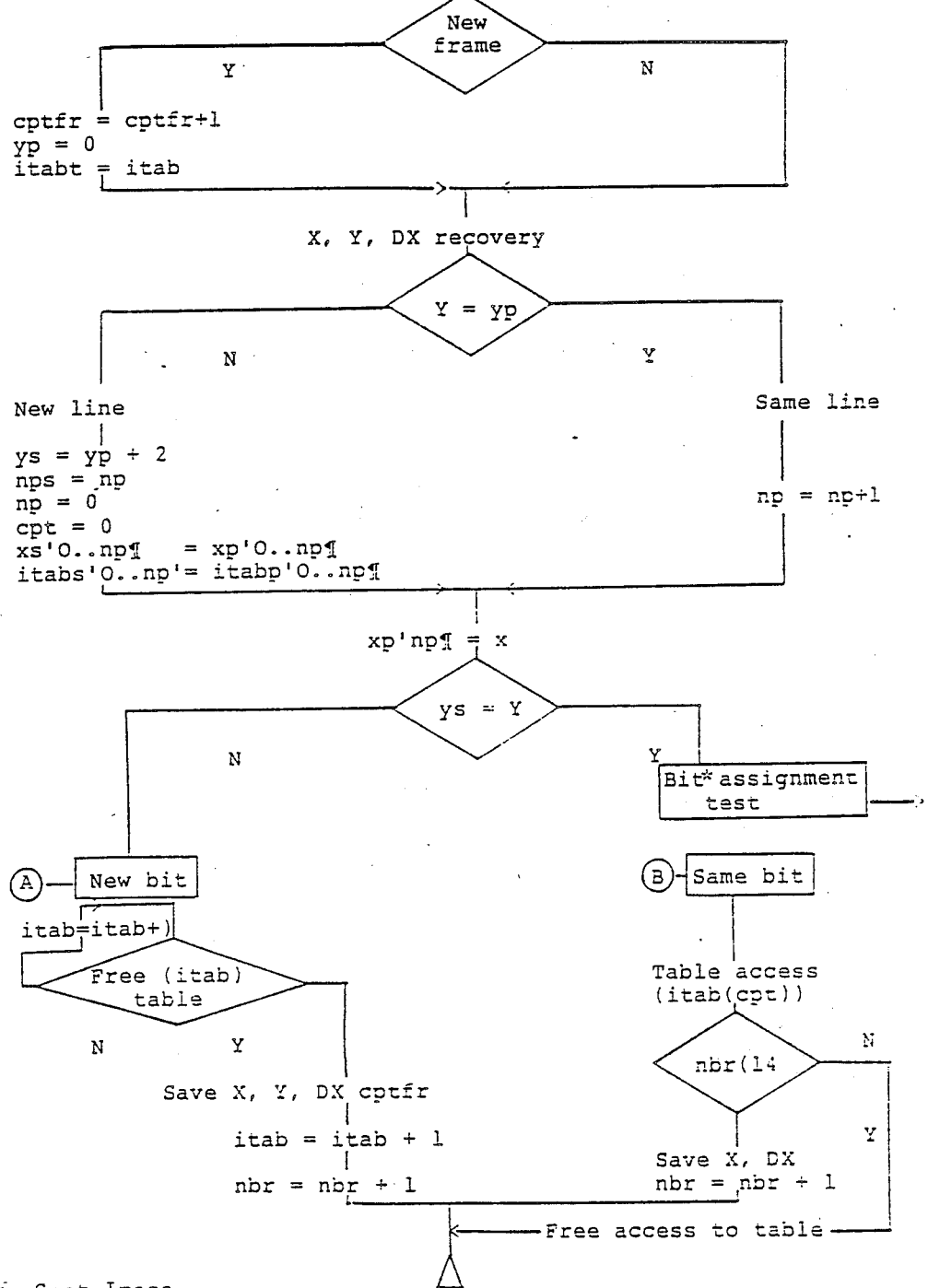
* Spot-Image

We claim:

1. An electro-optical device for performing real time measurement of the motion of a mobile, rigid structure under the influence of a fluid, wherein said device comprises at least four bright spots at predetermined unaligned positions on the structure under study, at least two synchronized video cameras whose positions are defined in a fixed frame of reference in such a way that at least three of said bright spots lie within the common field of view of said at least two cameras, wherein the dimensions of each bright spot are such that the image of each spot intercepts approximately five to fifteen scanning lines in the focal plane of each video camera, wherein the video signals provided by said cameras are supplied to a processing unit comprising a number of analog circuits capable of extracting synchronization signals and acquiring image coordinates of singular points whose brightness is above a preset level ($n_1$), wherein said processsing unit further comprises counter and memory circuits to count and record coordinates and lengths of scan line segments intercepted by said bright spots in each said camera, and control and interface circuits connected to a computer to determine the image coordinates of the barycenters of said bright spots in the focal plane of each camera, whereby the barycenter coordinates of the bright spots are defined with respect to a fixed frame of reference to derive the three translational and three rotational motions of the said structure from the variation of said barycenter coordinates.

2. The device according to claim 1, characterized in that it comprises five bright spots in a single plane arranged on the floating structure in two concurrent directions in the shape of a V, with each arm of said V having three aligned bright spots and one spot in common.

3. The device according to claim 1, characterized in that it comprises four nonaligned bright spots arranged on the floating structure, whereby three bright spots are arranged in the same plane.

4. The device according to claim 1, characterized in that the focal planes of said at least two video cameras are arranged at a fixed angle of 90° to one another.

5. The device according to claim 1, characterized in that it further comprises a removable rigid calibration structure on which at least 10 bright spots are arranged at predetermined geometric positions with respect to a fixed point in at least two different planes, whereby means are provided to adjust the positions of said at least two video cameras with respect to the rigid calibration structure.

6. device according to claim 4, characterized in that the acquisition of measurements derived from analog signals provided by said at least two video cameras is carried out at a frequency of about 60 Hz.

7. The device according to claim 5, characterized in that it comprises means for inhibiting the acquisition of measurements derived from analog signals provided by said at least two video cameras concerning image zones formed by the video cameras where bright spots are not present.

8. The device according to claim 7, characterized in that said at least two video cameras can be moved in a known direction with respect to the fixed point.

9. The device according to claim 8, characterized in that it further comprises means of calculating parameters such as running motion x, yaw y and heading $\psi$ defining the trajectory of the floating structure as well as a means of maintaining the measured parameters of the trajectory of said floating structure with respect to a reference position ($x_o$, $y_o$, $\psi_o$).

10. The device according to claim 9, characterized in that the frequency of the control means is lower than the measurement acquisition frequency and is about 10 Hz.

11. The device according to claim 10, characterized in that the bright spots comprise disk-shaped reflectors illuminated by projectors located in the vicinity of the video cameras.

12. An electro-optical method of real time measurement of the movement of a mobile rigid structure under the influence of a fluid in three dimensional space, wherein the measurement comprises the following steps:
 (a) placing at least four nonaligned bright spots at predetermined positions with respect to the structure under study;
 (b) positioning at least two synchronized cameras in the vicinity of said structure, whereby the viewfinder axes of these cameras are aligned so that the field of view of each camera includes at least three common bright spots, and the dimensions of each bright spot are such that the image of each spot intercepts some five to fifteen scanning lines at the focal plane of each video camera;
 (c) detecting in the video signals supplied by each camera synchronization signals indicating brightness at a level exceeding a given predetermined value ($n_1$);
 (d) counting and memorizing the coordinates (X, Y) and the lengths of the scanning line segments intercepting said bright spots in each video camera;
 (e) calculating the image coordinates, in the focal plane of each camera, of the barycenter of each bright spot detected, by using the coordinates (X, Y) and the lengths of the scanning line segments intercepted by each bright spot detected, and then the three-dimensional coordinates of each said bright spot with respect to a fixed frame of reference are used to derive the three translatory and three rotary movements of the structure from the divergence of the three dimensional coordinates of each bright spot with respect to the fixed frame of reference.

13. The method according to claim 12, characterized in that the video cameras are calibrated in advance by observation of the bright spots arranged at fixed positions with respect to a fixed frame of reference.

* * * * *